US009620818B2

(12) United States Patent
Han et al.

(10) Patent No.: US 9,620,818 B2
(45) Date of Patent: Apr. 11, 2017

(54) ELECTROLYTE FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Sang-Il Han, Yongin-si (KR);
Duck-Hyun Kim, Yongin-si (KR);
Young Sam Park, Yongin-si (KR);
Moon-Sung Kim, Yongin-si (KR);
Woo-Cheol Shin, Yongin-si (KR);
Bong-Chull Kim, Yongin-si (KR);
Jeong-Hye Lee, Yongin-si (KR);
E-Rang Cho, Yongin-si (KR);
Min-Young Lee, Yongin-si (KR);
Ho-Seok Yang, Yongin-si (KR);
Byung-Hwa Kim, Busan (KR);
Young-Hwan Park, Busan (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 14/602,152

(22) Filed: Jan. 21, 2015

(65) Prior Publication Data
US 2015/0295275 A1 Oct. 15, 2015

(30) Foreign Application Priority Data
Apr. 9, 2014 (KR) .................. 10-2014-0042634

(51) Int. Cl.
H01M 10/0567 (2010.01)
H01M 10/052 (2010.01)
(Continued)

(52) U.S. Cl.
CPC ..... *H01M 10/0567* (2013.01); *H01M 10/052* (2013.01); *H01M 10/0568* (2013.01);
(Continued)

(58) Field of Classification Search
CPC .......... H01M 10/0567; H01M 10/052; H01M 10/0568; H01M 10/0569; H01M 2220/30;
(Continued)

(56) References Cited

U.S. PATENT DOCUMENTS

2006/0263689 A1* 11/2006 Ishihara .................. C22C 13/00
429/221
2011/0008681 A1 1/2011 Koh et al.
(Continued)

FOREIGN PATENT DOCUMENTS

| EP | 2 660 920 A2 | 11/2013 |
|---|---|---|
| JP | 2009-211822 | 9/2009 |
| JP | 2010-050021 | 3/2010 |
| JP | 5234000 | 4/2013 |
| KR | 10-2012-0090095 | 8/2012 |

OTHER PUBLICATIONS

JP 2010050021 MT.*
(Continued)

*Primary Examiner* — Alex Usyatinsky
(74) *Attorney, Agent, or Firm* — Lewis Roca Rothgerber Christie LLP

(57) ABSTRACT

An electrolyte for a rechargeable lithium battery includes a lithium salt, an organic solvent and an additive. The organic solvent includes a sulfur-containing compound represented by Chemical Formula 1, and the additive includes a phosphazene compound represented by Chemical Formula 2. A rechargeable lithium battery including the electrolyte may have improved performance and safety.

(Continued)

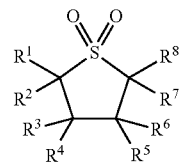

Chemical Formula 1

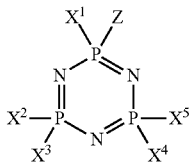

Chemical Formula 2

In Chemical Formulae 1 and 2, the substituents are as defined in the detailed description.

7 Claims, 11 Drawing Sheets

(51) Int. Cl.
*H01M 10/0569* (2010.01)
*H01M 10/0568* (2010.01)

(52) U.S. Cl.
CPC .... *H01M 10/0569* (2013.01); *H01M 2220/30* (2013.01); *H01M 2300/0028* (2013.01); *H01M 2300/0034* (2013.01); *H01M 2300/0037* (2013.01); *Y02E 60/122* (2013.01)

(58) Field of Classification Search
CPC ..... H01M 2300/37; H01M 2300/0034; H01M 2300/0028; Y02E 60/122
See application file for complete search history.

(56) References Cited

U.S. PATENT DOCUMENTS

| | | | | |
|---|---|---|---|---|
| 2012/0064396 | A1* | 3/2012 | Nishie | H01M 10/052 429/199 |
| 2012/0219865 | A1* | 8/2012 | Kaneko | H01G 11/56 429/303 |
| 2013/0004839 | A1* | 1/2013 | Utsumi | H01M 10/0567 429/199 |
| 2013/0011728 | A1* | 1/2013 | Tokuda | H01M 4/134 429/200 |
| 2013/0295470 | A1* | 11/2013 | Shatunov | C07F 9/65815 429/338 |
| 2013/0330609 | A1* | 12/2013 | Sawa | H01M 4/587 429/200 |

OTHER PUBLICATIONS

EPO Search Report dated Jul. 23, 2015, for corresponding European Patent application 15160913.8, (10 pages).
Patent Abstracts of Japan, and English machine translation of Japanese Publication 2010-050021 dated Mar. 4, 2010, listed above, (19 pages).
Maca, J., et al., *Properties of Electrolytes for Li-ion Batteries with Higher Fire Safety*, Renewable Energy and Power Quality Journal, No. 11, Mar. 1, 2013, pp. 1-4. XP855282495.
Maca, J., et al, *Properties of Sulfolane Based Aprotic Electrolytes*, Portugaliae Electrochimica Acta. vol. 31. No. 6, Mar. 11, 2014, pp. 321-338, XP855282488.
UE, Makoto, et al, *Chapter 2: Nonaqueous Electrolytes and Advances in Solvents in: Electrolytes for Lithium and Lithium-Ion Batteries*, Jan. 1, 2014, Springer, pp. 93-165, XP055202481.
English machine translation of Japanese Publication No. JP 2009-211822, dated Sep. 17, 2009, 15 pages.
Matsuda, Yoshiharu et al., "Characteristics of Sulfolane-Based Electrolytes for Rechargeable Lithium Batteries", Journal of the Electrochemical Society, Nov. 1985, pp. 2538-2543.
Naoi, Katsuhiko et al., "Nonflammable Hydrofluoroether for Lithium-Ion Batteries: Enhanced Rate Capability, Cyclability, and Low-Temperature Performance", Journal of the Electrochemical Society, Feb. 4, 2009, pp. A272-A276, vol. 156, Issue 4.

* cited by examiner

FIG. 8

| Charging Voltage(V) | Compression Rate(%) | Comparative Example 2 | Example 2 |
|---|---|---|---|
| 4.4 | 37 | 1NG, 90K/10Cell | 100K/10Cell |

ELECTROLYTE FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2014-0042634 filed in the Korean Intellectual Property Office on Apr. 9, 2014, the entire content of which is incorporated herein by reference.

BACKGROUND

1. Field

The present disclosure is directed to an electrolyte for a rechargeable lithium battery and a rechargeable lithium battery including the same.

2. Description of the Related Art

Recent developments of smaller and lighter in weight electronic devices have lead to an increase in demand for portable electronic devices. Accordingly, demand for batteries with high energy density, as a power source for such portable electronic devices, has also increased.

A rechargeable lithium battery is typically manufactured by injecting an electrolyte into a battery cell, which includes a positive electrode including a positive active material capable of intercalating/deintercalating lithium and a negative electrode including a negative active material capable of intercalating/deintercalating lithium.

An electrolyte typically includes an organic solvent in which a lithium salt is dissolved. The organic solvent may be a critical factor in improving stability and performance of a rechargeable lithium battery.

When the electrolyte is in a gas state, it may be ignited and combusted during a radical chain reaction. Accordingly, a self-extinguishing material may be added to the electrolyte. The self-extinguishing material reacts with active radicals (H and .OH produced by the combustion reaction) and suppresses the radical chain reaction, thus providing an electrolyte with improved flame retardancy. However, while the self-extinguishing material may improve the flame retardancy of the electrolyte, it may also deteriorate battery performance.

SUMMARY

One or more aspects of embodiments of the present invention are directed toward an electrolyte for a rechargeable lithium battery that can provide for an improved performance and safety.

Another embodiment is directed toward a rechargeable lithium battery including the electrolyte.

In one embodiment, an electrolyte for a rechargeable lithium battery includes a lithium salt; an organic solvent including a sulfur-containing compound represented by Chemical Formula 1; and an additive including a phosphazene compound represented by Chemical Formula 2.

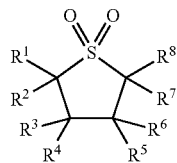

Chemical Formula 1

In Chemical Formula 1, $R^1$ to $R^8$ are each independently hydrogen, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C6 to C30 cycloalkynyl group, or a substituted or unsubstituted C6 to C30 aryl group.

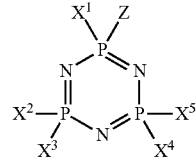

Chemical Formula 2

In Chemical Formula 2, $X^1$ to $X^5$ are each independently a halogen or a halogen-containing group, and Z is $NR^9R^{10}$ or $OR^{11}$, where $R^9$ and $R^{10}$ are each independently a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C1 to C30 haloalkyl group, a substituted or unsubstituted C6 to C30 aryl group, a substituted or unsubstituted C6 to C30 halogenated aryl group, a substituted or unsubstituted C7 to C20 arylalkyl group, a substituted or unsubstituted C1 to C20 heteroalkyl group, a substituted or unsubstituted C2 to C30 heterocycloalkyl group, a substituted or unsubstituted C2 to C30 heteroaryl group, or a substituted or unsubstituted C1 to C20 aldehyde; and $R^{11}$ is a substituted or unsubstituted C1 to C30 alkyl group.

In Chemical Formula 1, $R^1$ to $R^8$ may be each independently hydrogen or a substituted or unsubstituted C1 to C30 alkyl group.

The sulfur-containing compound of Chemical Formula 1 may be included in an amount of about 1% to about 20% by volume, and in some embodiments about 1% to 10% by volume, based on the total amount of the organic solvent.

In Chemical Formula 2, at least one of $X^1$ to $X^5$ may be a halogen, and in some embodiments $X^1$ to $X^5$ may each independently be a halogen, and in some embodiments $X^1$ to $X^5$ may each independently be fluorine.

In Chemical Formula 2, Z may be $NR^9R^{10}$, where $R^9$ and $R^{10}$ are each independently a substituted or unsubstituted C1 to C30 alkyl group or a substituted or unsubstituted C1 to C30 cycloalkyl group.

In Chemical Formula 2, Z may be $OR^{11}$, where $R^{11}$ is a substituted or unsubstituted C1 to C30 alkyl group.

In Chemical Formula 2, Z may be $OR^{11}$, where $R^{11}$ is a substituted or unsubstituted C1 to C5 alkyl group.

The phosphazene compound of Chemical Formula 2 may be one of compounds represented by the following Chemical Formulae 3 to 5.

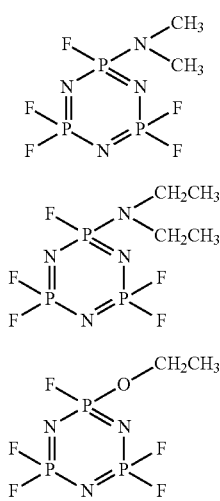

Chemical Formula 3

Chemical Formula 4

Chemical Formula 5

The phosphazene compound may be included in an amount of about 1 to about 30 parts by weight, and in some embodiments about 3 to about 15 parts by weight, based on 100 parts by weight of the organic solvent.

The organic solvent may further include a carbonate-based compound including diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or a combination thereof.

The additive may further include fluoroethylene carbonate, vinylethylene carbonate, propane sultone, succinonitrile, adiponitrile, $LiBF_4$, or a combination thereof.

The electrolyte may have a viscosity of less than or equal to about 7 cP.

The electrolyte may have an ion conductivity of greater than or equal to about 5 mS/cm.

In another embodiment, a rechargeable lithium battery includes a positive electrode; a negative electrode; a separator; and the electrolyte.

Other embodiments are included in the following detailed description.

A rechargeable lithium battery having improved performance and safety may be realized.

BRIEF DESCRIPTION OF THE DRAWINGS

FIG. 8 is a cell photograph showing the compression test results of the rechargeable lithium battery cells according to Example 2 and Comparative Example 2.

DETAILED DESCRIPTION

Figure 1:
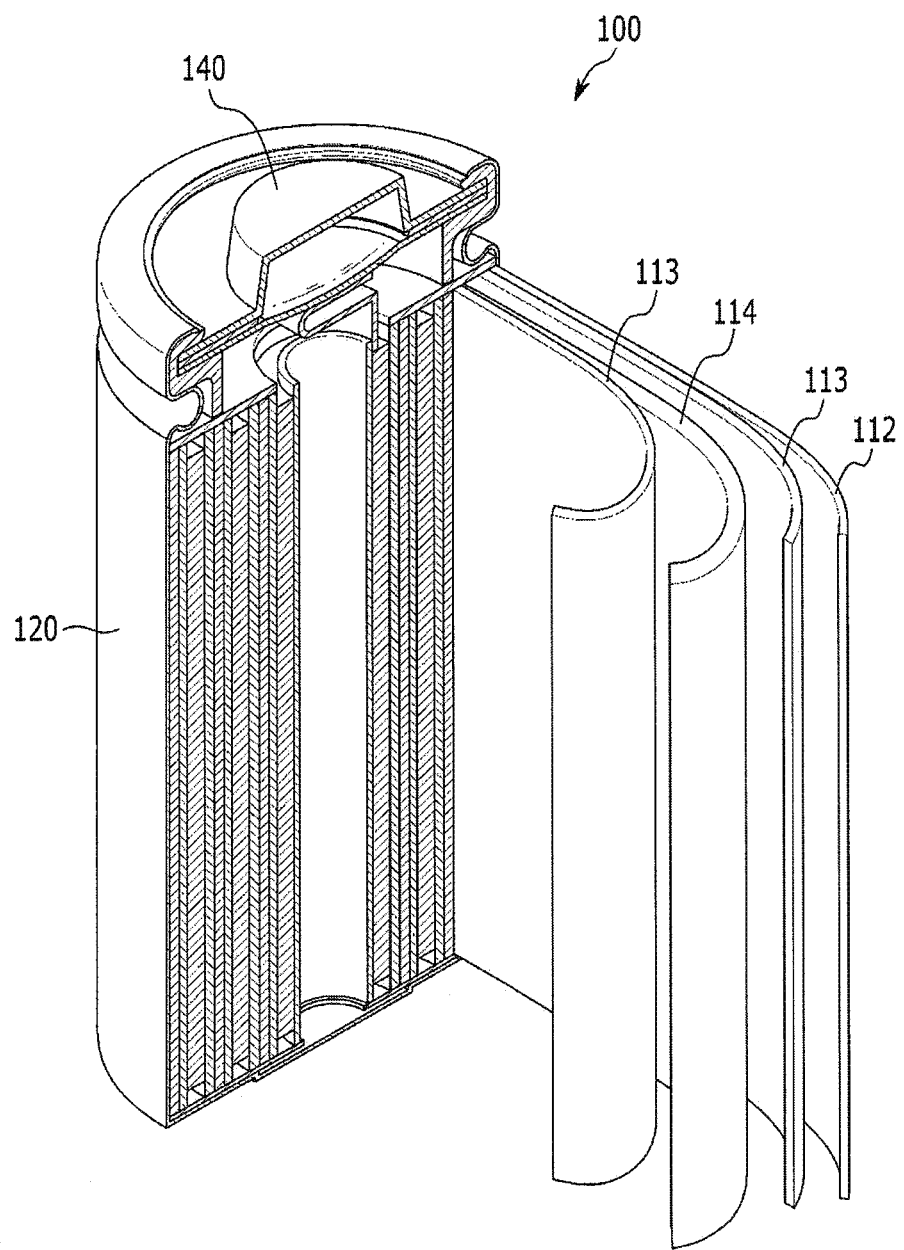
FIG. 1 is a schematic view showing a rechargeable lithium battery according to one embodiment.

Hereinafter, embodiments of the present invention are described in more detail. However, these embodiments are exemplary, and this disclosure is not limited thereto.

As used herein, when a definition is not otherwise provided, the term "substituted" refers to one substituted with a substituent selected from a halogen (e.g. F, Br, Cl or I), a hydroxyl group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

As used herein, when a definition is not otherwise provided, the term 'hetero' refers to one including 1 to 3 hetero atoms selected from N, O, S, and P as ring atoms or main chain atoms. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

An electrolyte for a rechargeable lithium battery according to one embodiment includes a lithium salt, an organic solvent, and an additive. In one embodiment, the organic solvent includes a sulfur-containing compound represented by Chemical Formula 1, and the additive includes a phosphazene compound represented by Chemical Formula 2.

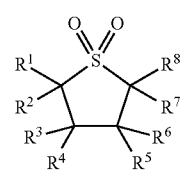

Chemical Formula 1

In Chemical Formula 1, $R^1$ to $R^8$ are each independently hydrogen, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C6 to C30 cycloalkynyl group, or a substituted or unsubstituted C6 to C30 aryl group.

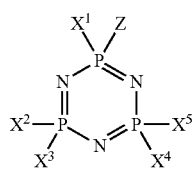

Chemical Formula 2

In Chemical Formula 2, $X^1$ to $X^5$ are each independently halogen or a halogen-containing group, and Z is $NR^9R^{10}$ or $OR^{11}$, where $R^9$ and $R^{10}$ are each independently a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C1 to C30 haloalkyl group, a substituted or unsubstituted C6 to C30 aryl group, a substituted or unsubstituted C6 to C30 halogenated aryl group, a substituted or unsubstituted C7 to C20 arylalkyl group, a substituted or unsubstituted C1 to C20 heteroalkyl group, a substituted or unsubstituted C2 to C30 heterocycloalkyl group, a substituted or unsubstituted C2 to C30 heteroaryl group, or a substituted or unsubstituted C1 to C20 aldehyde, and $R^{11}$ is a substituted or unsubstituted C1 to C30 alkyl group.

In a rechargeable lithium battery, an electrolyte or an oxide-based positive active material can decompose during ignition to generate oxygen. The phosphazene compound represented by Chemical Formula 2 may capture the oxygen generated during the ignition and thus, may prevent (or reduce) the combustion of the electrolyte. In addition, the phosphazene compound may work as a film decomposition additive and may form a film having low resistance. Accordingly, the resulting rechargeable lithium battery may have improved performance.

The sulfur-containing compound represented by the Chemical Formula 1 has excellent oxidation stability and resistance against oxidation in a high voltage battery and also, retardant characteristics (i.e., that a fire is not well caught). In addition, the sulfur-containing compound is reduced and decomposed on a negative electrode and may form a solid electrolyte interface (SEI) film thereon, and the SEI film may give high temperature cycle-life characteristics as well as bring postpone a self exothermic speed when a battery is exposed to heat.

In one embodiment, when the sulfur-containing compound and the phosphazene compound are included in the electrolyte, a rechargeable lithium battery may have improved stability and performance.

In one embodiment, each of $R^1$ to $R^8$ in the sulfur-containing compound of Chemical Formula 1 may be hydrogen or a substituted or unsubstituted C1 to C30 alkyl group. In one embodiment, each of $R^1$ to $R^8$ in the sulfur-containing compound of Chemical Formula 1 may be hydrogen, and the sulfur-containing compound may be sulfolane.

The sulfur-containing compound may be included in an amount of about 0.1% to about 20% by volume, and in some embodiments about 0.1% to about 10% by volume, about 0.3% to about 5% by volume, or about 0.5% to about 3% by volume, based on the total amount of the organic solvent. When the sulfur-containing compound is included within any of these ranges, flash point of the electrolyte can be increased and thus, flame retardancy may be improved. In addition, ion conductivity may also be increased, thus improving the performance of the rechargeable lithium battery.

At least one of $X^1$ to $X^5$ in the phosphazene compound of Chemical Formula 2 may be a halogen, and in some embodiments $X^1$ to $X^5$ may each be a halogen, and in some embodiments, $X^1$ to $X^5$ may each be fluorine.

When Z in Chemical Formula 2 is $NR^9R^{10}$, $R^9$ and $R^{10}$ may each independently be a substituted or unsubstituted C1 to C30 alkyl group or a substituted or unsubstituted C1 to C30 cycloalkyl group.

In one embodiment, Z may be an alkoxy group such as $OR^{11}$. When Z is an alkoxy group such as $OR^{11}$, the electrolyte may have a high flash point and good self-extinguishing characteristics and thus, good flame retardancy. In one embodiment, $R^{11}$ may be a substituted or unsubstituted C1 to C30 alkyl group, and in one embodiment a substituted or unsubstituted C1 to C5 alkyl group.

The phosphazene compound represented by Chemical Formula 2 may be one of compounds represented by the following Chemical Formulae 3 to 5.

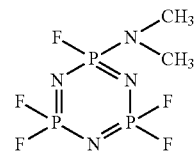

Chemical Formula 3

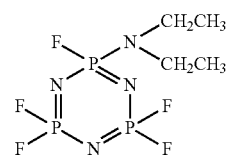

Chemical Formula 4

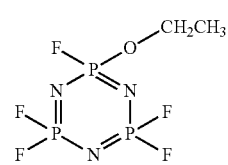

Chemical Formula 5

The phosphazene compound may improve flame retardancy of the electrolyte without substantially deteriorating performance of the battery.

The phosphazene compound may be included in an amount of about 1 to about 30 parts by weight, and in some embodiments about 3 to about 20 parts by weight, or about 3 to about 15 parts by weight, based on 100 parts by weight of the organic solvent. When the phosphazene compound is included within any of these ranges, a flash point of the electrolyte can be increased and good flame retardancy may be obtained, thus improving the stability of the battery without substantially deteriorating battery performance in terms of rate capability, cycle-life characteristics and the like.

The organic solvent may further include a carbonate-based compound such as, for example, diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or a combination thereof.

An ester-based compound, an ether-based compound, a ketone-based compound, an alcohol-based compound or a combination thereof may be included in the organic solvent, instead of or together with the carbonate-based compound.

The ester-based compound may be, without limitation, methylacetate, ethylacetate, n-propylacetate, dimethylacetate, methylpropionate, ethylpropionate, γ-butyrolactone, decanolide, valerolactone, mevalonolactone, caprolactone, or the like. The ether-based compound may be, without limitation, dibutylether, tetraglyme, diglyme, dimethoxyethane, 2-methyltetrahydrofuran, tetrahydrofuran, or the like. The ketone-based compound may be, without limitation, cyclohexanone or the like, and the alcohol-based compound may be, without limitation, ethanol, isopropyl alcohol, or the like.

The additive may include fluoroethylene carbonate, vinylethylene carbonate, propane sultone, succinonitrile, adiponitrile, LiBF$_4$, or a combination thereof, in addition to the phosphazene compound.

When the additive includes fluoroethylene carbonate, the fluoroethylene carbonate may be included in an amount of about 3 to about 50 parts by weight, and in some embodiments about 5 to about 20 parts by weight, based on 100 parts by weight of the organic solvent. When the additive includes vinylethylene carbonate, the vinylethylene carbonate may be included in an amount of about 0.1 to about 2 parts by weight, and in some embodiments about 0.3 to about 1 part by weight, based on 100 parts by weight of the organic solvent. When the fluoroethylene carbonate and/or the vinylethylene carbonate are respectively included within any of these ranges, a desired film capable of contributing to improving cycle-life characteristics of the battery may be formed on the negative electrode.

When the additive includes propane sultone, the propane sultone may be included in an amount of about 1 to about 5 parts by weight, and in some embodiments about 1.5 to about 3 parts by weight, based on 100 parts by weight of the organic solvent. When the additive includes succinonitrile, the succinonitrile may be included in an amount of about 1 to about 10 parts by weight, and in some embodiments about 2 to about 7 parts by weight, based on 100 parts by weight of the organic solvent. When the propane sultone and/or the succinonitrile are respectively included within any of these ranges, cycle-life characteristics at a high temperature may be improved, and a thickness increase of the battery allowed to stand at a high temperature may be suppressed (or reduced).

In one embodiment, the lithium salt is dissolved in the organic solvent, operates as a lithium ion source in a battery, and promotes the movement of lithium ions between positive and negative electrodes, thus facilitating the basic operation of the rechargeable lithium battery.

The lithium salt may include LiPF$_6$, LiBF$_4$, LiSbF$_6$, LiAsF$_6$, LiN(SO$_3$C$_2$F$_5$)$_2$, LiC$_4$F$_9$SO$_3$, LiClO$_4$, LiAlO$_2$, LiAlCl$_4$, LiN(C$_x$F$_{2x+1}$SO$_2$(C$_y$F$_{2y+1}$SO$_2$) (where x and y are each natural numbers), LiCl, LiI, LiB(C$_2$O$_4$)$_2$ (lithium bisoxalatoborate (LiBOB)), lithium bis(fluorosulfonyl)imide (LiFSI), or a combination thereof.

The concentration of the lithium salt may be about 0.1 to about 2.0 M. When the concentration of the lithium salt is within this range, the electrolyte may have good conductivity and viscosity and may effectively move lithium ions, thus exhibiting good electrolyte performance.

The viscosity of the electrolyte may be less than or equal to about 7 cP, and in some embodiments less than or equal to about 5 cP, or about 4 to about 5 cP. When the electrolyte has the viscosity within any of these ranges, good battery performance and rate capability may be obtained.

The ion conductivity of the electrolyte may be greater than or equal to about 5 mS/cm, and in some embodiments about 5 to about 12 mS/cm, or about 6 to about 9 mS/cm. When the electrolyte has the ion conductivity within any of these ranges, good cycle-life characteristics may be obtained.

Hereinafter, a rechargeable lithium battery including the electrolyte is described referring to FIG. 1.

FIG. 1 is a schematic view showing a rechargeable lithium battery according to one embodiment.

Referring to FIG. 1, a rechargeable lithium battery 100 includes a positive electrode 114, a negative electrode 112 facing the positive electrode 114, a separator 113 between the negative electrode 112 and the positive electrode 114, an electrolyte impregnating the negative electrode 112, the positive electrode 114, and the separator 113, a battery case 120, and a sealing member 140 sealing the battery case 120.

The rechargeable lithium battery of embodiments of the present invention is not limited to any particular shape or a kind of battery. For example, the rechargeable lithium battery may be in a shape of a cylinder, a prism, a pouch, or the like, and may include the above-described electrolyte.

In one embodiment, the positive electrode includes a positive current collector and a positive active material layer on the positive current collector. The positive active material layer includes a positive active material, a binder, and, optionally, a conductive material.

The positive current collector may be Al (aluminum), but is not limited thereto.

The positive active material may include lithiated intercalation compounds capable of reversibly intercalating and deintercalating lithium ions. In one embodiment, at least one composite oxide of lithium and a metal of cobalt, manganese, nickel, or a combination thereof may be utilized, and non-limiting examples of the composite oxide may include compounds represented by one of the following Chemical Formulae:

Li$_a$A$_{1-b}$B$_b$D$_2$ (where 0.90≤a≤1.8 and 0≤b≤0.5); Li$_a$E$_{1-b}$B$_b$O$_{2-c}$D$_c$ (where 0.90≤a≤1.8, 0≤b≤0.5, 0≤c≤0.05); LiE$_{2-b}$B$_b$O$_{4-c}$D$_c$ (where 0≤b≤0.5, 0≤c≤0.05); Li$_a$Ni$_{1-b-c}$Co$_b$B$_c$D$_\alpha$ (where 0.90≤a≤1.8, 0≤b≤0.5, 0≤c≤0.05, 0<α≤2); Li$_a$Ni$_{1-b-c}$Co$_b$B$_c$O$_{2-\alpha}$F$_\alpha$ (where 0.90≤a≤1.8, 0≤b≤0.5, 0≤c≤0.05, 0<α≤2); Li$_a$Ni$_{1-b-c}$Co$_b$B$_c$O$_{2-\alpha}$F$_2$ (where 0.90≤a≤1.8, 0≤b≤0.5, 0≤c≤0.05, 0<α<2); Li$_a$Ni$_{1-b-c}$Mn$_b$B$_c$D$_\alpha$ (where 0.90≤a≤1.8, 0≤b≤0.5, 0≤c≤0.05, 0<α≤2); Li$_a$Ni$_{1-b-c}$Mn$_b$B$_c$O$_{2-\alpha}$F$_\alpha$ (where 0.90≤a≤1.8, 0≤b≤0.5, 0≤c≤0.05, 0<α<2); Li$_a$Ni$_{1-b-c}$Mn$_b$B$_c$O$_{2-\alpha}$F$_2$ (where 0.90≤a≤1.8, 0≤b≤0.5, 0≤c≤0.05, 0<α≤2); Li$_a$Ni$_b$E$_c$G$_d$O$_2$ (where 0.90≤a≤1.8, 0≤b≤0.9, 0≤c≤0.5, 0.001≤d≤0.1); Li$_a$Ni$_b$Co$_c$Mn$_d$G$_e$O$_2$ (where 0.90≤a≤1.8, 0≤b≤0.9, 0≤c≤0.5, 0≤d≤0.5, 0.001≤e≤0.1); Li$_a$NiG$_b$O$_2$ (where 0.90≤a≤1.8, 0.001≤b≤0.1); Li$_a$CoG$_b$O$_2$ (where 0.90≤a≤1.8, 0.001≤b≤0.1); Li$_a$MnG$_b$O$_2$ (where 0.90≤a≤1.8, 0.001≤b≤0.1); Li$_a$Mn$_2$G$_b$O$_4$ (where 0.90≤a≤1.8, 0.001≤b≤0.1); QO$_2$; QS$_2$; LiQS$_2$; V$_2$O$_5$; LiV$_2$O$_5$; LiIO$_2$; LiNiVO$_4$; Li$_{(3-f)}$J$_2$(PO$_4$)$_3$ (0≤f≤2); Li$_{(3-f)}$Fe$_2$(PO$_4$)$_3$ (0≤f≤2); and LiFePO$_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The positive active material may be, without limitation, lithium cobalt oxide, lithium nickel cobalt manganese oxide, lithium nickel cobalt aluminum oxide, or a combination thereof.

The binder improves the binding properties of the positive active material particles with one another and with the current collector. Examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves the conductivity of the electrode. Any suitable electrically conductive material may be utilized as the conductive material, so long as it does not cause a chemical change in the battery. Non-limiting examples of the conductive material may include one or more of natural graphite, artificial graphite, carbon black, acetylene black, ketjen black, a carbon fiber, a metal powder, a metal fiber and the like of copper, nickel, aluminum, silver, and the like, a conductive polymer such as a polyphenylene derivative, and the like.

In one embodiment, the negative electrode includes a negative current collector and a negative active material layer on the negative current collector.

The negative current collector may be a copper foil, a nickel foil, a stainless steel foil, a titanium foil, a nickel foam, a copper foam, a polymer substrate coated with a conductive metal, or a combination thereof, but is not limited thereto.

The negative active material layer includes a negative active material, a binder, and, optionally, a conductive material.

The negative active material may be a material that reversibly intercalates/deintercalates lithium ions, a lithium metal, a lithium metal alloy, a material capable of doping and dedoping lithium, or transition metal oxide.

The material that reversibly intercalates/deintercalates lithium ions may be a carbon material and may be any suitable carbon-based negative active material for a rechargeable lithium battery. Non-limiting examples of the material that reversibly intercalates/deintercalates lithium ions may include crystalline carbon, amorphous carbon, or a mixture thereof. Examples of the crystalline carbon may include, without limitation, graphite such as amorphous, sheet-shaped, flake-shaped, spherically-shaped or fiber-shaped natural graphite or artificial graphite, and examples of the amorphous carbon may include, without limitation, soft carbon (low temperature fired carbon) or hard carbon, a mesophase pitch carbonized product, fired coke, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn, but the lithium metal alloy is not limited thereto.

The material capable of doping and dedoping lithium may be Si, $SiO_x$ (where $0<x<2$), a Si—C composite, a Si—Y alloy (where Y is selected from an alkali metal, an alkaline-earth metal, a Group 13 to 16 element, a transition metal, a rare earth element, and a combination thereof, and Y is not Si), Sn, $SnO_2$, a Sn—C composite, Sn—Y (where Y is selected from an alkali metal, an alkaline-earth metal, a Group 13 to 16 element, a transition metal, a rare earth element, and a combination thereof, and Y is not Sn), or the like, and at least one of these may be mixed with $SiO_2$. Non-limiting examples of Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be vanadium oxide, lithium vanadium oxide, and the like, but the transition metal oxide is not limited thereto.

The binder improves the binding properties of the negative active material particles with one another and with the current collector, and non-limiting examples of the binder may include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material improves the electrical conductivity of the electrode. Any suitable electrically conductive material may be utilized as the conductive material, so long as it does not cause a chemical change in the battery. Non-limiting examples of the conductive material may include a carbon-based material such as natural graphite, artificial graphite, carbon black, acetylene black, ketjen black, a carbon fiber, or the like; a metal-based material such as a metal powder or a metal fiber or the like of copper, nickel, aluminum, silver, or the like; a conductive polymer such as a polyphenylene derivative or the like; or a mixture thereof.

The negative electrode and the positive electrode may be each manufactured by a method including mixing the active material, the binder, and the conductive material to obtain an active material composition, and coating the resulting active material composition on a current collector. The electrode manufacturing method should be apparent to those of ordinary skill in the art, and thus is not described in detail in the present specification. In one embodiment, the solvent includes N-methylpyrrolidone or the like, but is not limited thereto.

The separator may include any materials suitable to be utilized in a conventional lithium battery as long as these materials are capable of separating a negative electrode from a positive electrode and providing a transporting passage for lithium ions. In other words, the separator may have a low resistance to ion transportation and good impregnation characteristics for an electrolyte. For example, the separator may be selected from a glass fiber separator, a polyester separator, a polyethylene separator, a polypropylene separator, a polytetrafluoroethylene (PTFE) separator, or a combination thereof, but the separator is not limited thereto. In one embodiment, the separator may have a form of a non-woven fabric or a woven fabric. For example, a polyolefin-based polymer separator such as polyethylene, polypropylene or the like may be utilized for a lithium ion battery. In one embodiment, a coated separator including a ceramic component or a polymer material may provide for improved heat resistance and/or mechanical strength. The coated separator may have a mono-layered or multi-layered structure.

A rechargeable lithium battery including the above-described electrolyte may provide for good stability, as well as maintain performance.

Hereinafter, embodiments of the present invention are illustrated with reference to examples. These examples, however, are for illustrative purposes only and should not in any sense be interpreted as limiting the scope of the present invention.

Furthermore, what is not described in this disclosure should be apparent to those of ordinary skill in the art and will not be illustrated here.

Examples 1 to 4 and Comparative Examples 1 to 7

$LiCoO_2$, polyvinylidene fluoride and carbon black in a weight ratio of 96:2:2 were added to an N-methylpyrrolidone (NMP) solvent, thus preparing a slurry. The slurry was coated on an aluminum (Al) foil and then, dried and compressed, thus manufacturing a positive electrode.

Graphite, carboxymethyl cellulose and styrene-butadiene rubber in a weight ratio of 98:1:1 were added to distilled water, thus preparing a slurry. The slurry was coated on a copper foil and then, dried and compressed, thus manufacturing a negative electrode.

An electrolyte for each of Examples 1 through 4 and Comparative Examples 1 through 7 was manufactured by adding a lithium salt and additives to an organic solvent in a respective composition provided in the following Table 1.

A polyethylene separator was included together with the positive and negative electrodes and the electrolyte to manufacture a rechargeable lithium battery cell.

TABLE 1

| | | Examples | | | | Comparative Examples | | | | | | |
|---|---|---|---|---|---|---|---|---|---|---|---|---|
| | | 1 | 2 | 3 | 4 | 1 | 2 | 3 | 4 | 5 | 6 | 7 |
| Lithium salt | $LiPF_6$ (M) | 0.9 | 0.9 | 0.9 | 0.9 | 0.9 | 0.9 | 0.9 | 0.9 | 0.9 | 0.9 | 0.9 |
| Organic solvent | EC (wt %) | 30 | 20 | 20 | 30 | 30 | 20 | 30 | 30 | 30 | 30 | 30 |
| | EP (wt %) | 19 | 24 | 24 | 19 | 20 | 25 | 20 | 20 | 19 | 19 | 17 |
| | DEC (wt %) | 49 | 54 | 54 | 48 | 50 | 55 | 50 | 50 | 49 | 49 | 46 |
| | Sulfolane (wt %) | 2 | 2 | 2 | 3 | — | — | — | — | 2 | 2 | 7 |
| Additive | Phosphazene of Chemical Formula 5 (parts by weight) | 7 | 7 | — | 6 | — | — | 6 | 7 | — | — | — |
| | Phosphazene of Chemical Formula 3 (parts by weight) | — | — | 7 | — | — | — | — | — | — | — | — |
| | Phosphazene of Chemical Formula 6 (parts by weight) | — | — | — | — | — | — | — | — | 7 | — | — |

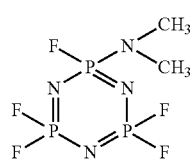

Chemical Formula 3

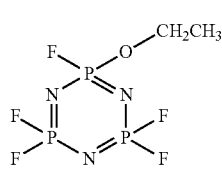

Chemical Formula 5

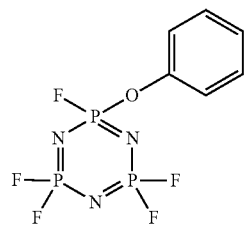

Chemical Formula 6

In Table 1, "EC" refers to ethylene carbonate, "EP" refers to ethylpropionate, and "DEC" refers to diethyl carbonate.

In addition, "parts by weight" are based on 100 parts by weight of the entire weight of the organic solvent.

Evaluation 1: Flame Retardancy of Electrolyte

Viscosity, ion conductivity, flash point and self-extinguishing time (SET) of each of the electrolytes according to Examples 1 to 4 and Comparative Examples 1 to 7 were measured and the results are provided in the following Table 2.

Viscosity was measured with Model SV-10 Viscometer produced by AND Corp. In more detail, the measurement of viscosity was obtained by preparing 80-gram specimens at a set or predetermined temperature, inserting a vibrator and a temperature sensor in the specimens up to a set or predetermined depth, waiting until a viscometer reaches the desired temperature, and reading the display at that temperature.

Ion conductivity was measured with Model CM-30R Conductivity Meter produced by TODAKK. In more detail, the measurement of ion conductivity was obtained by preparing 80-gram specimens at a set or predetermined temperature, inserting a detecting probe in the specimens, and reading the display when the conductivity depending on the temperature was stabilized.

Flash point was measured with Model HFP382 produced by Walter Herzog GmbH. In more detail, the flash point was obtained by preparing 50-ml specimens, respectively putting them in a measurement cell, setting the temperature of each cell at 15° C., igniting the specimens with a measurement instrument at every 0.5° C. intervals, while the temperature of the cell was being increased at a rate of 1° C./min, and measuring the lowest temperature at which the vapor of the specimens caught on fire.

Self-extinguishing time (SET) was evaluated by pouring 0.3 g of the electrolyte in the cap of a coin cell, bringing the electrolyte in contact with a flame for about one second, and examining whether the electrolyte would catch on fire. The results of the test are provided in the following Table 2, where "nonflammable" indicates that the electrolyte did not catch of fire even when contacted by a flame several times, and a number indicates the time (in seconds) that it took for the fire to self-extinguish if the electrolyte ignited.

TABLE 2

|  | Examples | | | | Comparative Examples | | | | | | |
| --- | --- | --- | --- | --- | --- | --- | --- | --- | --- | --- | --- |
|  | 1 | 2 | 3 | 4 | 1 | 2 | 3 | 4 | 5 | 6 | 7 |
| Viscosity (cP) | 4.48 | 3.53 | 4.55 | 4.60 | 4.35 | 3.73 | 4.21 | 4.38 | 5.0 | 4.40 | 5.4 |
| Ion conductivity (mS/cm) | 6.46 | 6.61 | 6.43 | 6.51 | 6.92 | 7.15 | 6.64 | 6.57 | 6.05 | 6.54 | 5.90 |
| Flash point (° C.) | 41.5 | 40 | 37 | 39 | 24 | 25 | 34 | 35 | 36 | 26 | 32 |
| SET (sec/0.3 g) | nonflammable | nonflammable | Ignited after being contacted with a flame 8 times | nonflammable | 29 | 30 | 25 | 26 | 12 | 27 | 5 |

Referring to Table 2, the cells according to Examples 1 to 4, which included the electrolyte including the sulfur-containing compound represented by Chemical Formula 1 and the phosphazene compound represented by Chemical Formula 2, exhibited a high flash point and excellent SET and thus, significantly better flame retardancy compared to the cells of Comparative Examples 1 to 7.

Evaluation 2: Cycle-Life Characteristics of Rechargeable Lithium Battery Cell

Figure 2:
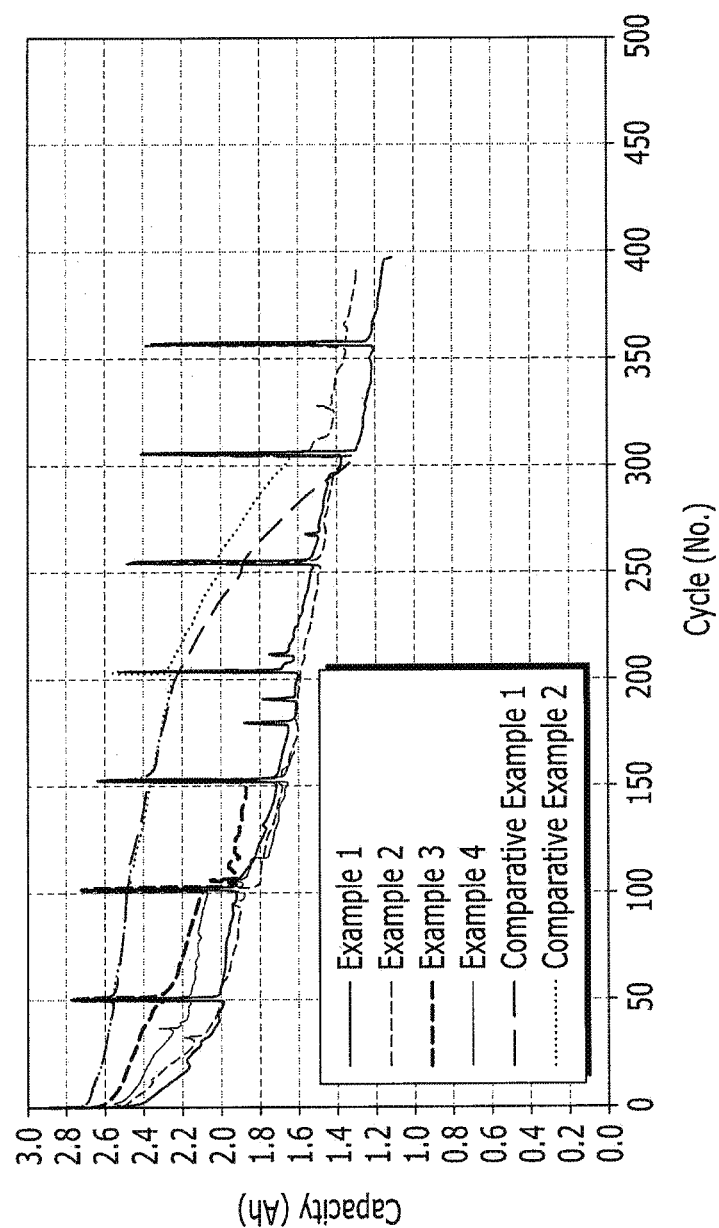
FIG. 2 is a graph showing cycle-life characteristics of rechargeable lithium battery cells according to Examples 1 to 4 and Comparative Examples 1 and 2.

The rechargeable lithium battery cells according to Examples 1 to 4 and Comparative Examples 1 and 2 were charged and discharged under the following conditions, their cycle-life characteristics were evaluated, and the results are provided in FIG. 2.

A cycle was performed by charging the cells at CCCV, 4.4V, 1 C, 0.1 C cut-off and discharging them at CC, 3V and 1 C. Then, the cells were charged at CCCV, 4.4V, 0.2 C, 0.02 C cut-off and discharged at CC, 0.2 C, 2.75V cut-off at every 50th cycle.

FIG. 2 is a graph showing cycle-life characteristics of the rechargeable lithium battery cells according to Examples 1 to 4 and Comparative Examples 1 and 2.

Referring to FIG. 2, rechargeable lithium battery cells according to Examples 1 to 4, which included the electrolyte including the sulfur-containing compound represented by Chemical Formula 1 and the phosphazene compound represented by Chemical Formula 2, showed significantly better cycle-life characteristics compared to the rechargeable lithium battery cells of Comparative Examples 1 and 2.

Evaluation 3: Thickness Increase Ratio of Rechargeable Lithium Battery Cell when Allowed to Stand at High Temperature After performing a formation process for each of the rechargeable lithium battery cells according to Examples 1 to 3 and Comparative Examples 1 and 2, the cells were fully charged and allowed to stand for two weeks in a 60° C. oven, and their thickness variation ratios were measured and the results are provided in FIG. 3.

The formation process was performed by once charging and discharging the rechargeable lithium battery cells at 0.2 C-rate at room temperature, and then allowing them to stand at room temperature for 24 hours and once again charging and discharging them and then, allowing them to stand at room temperature for 24 hours after aging them in a 45° C. chamber for 2 days.

Figure 3:
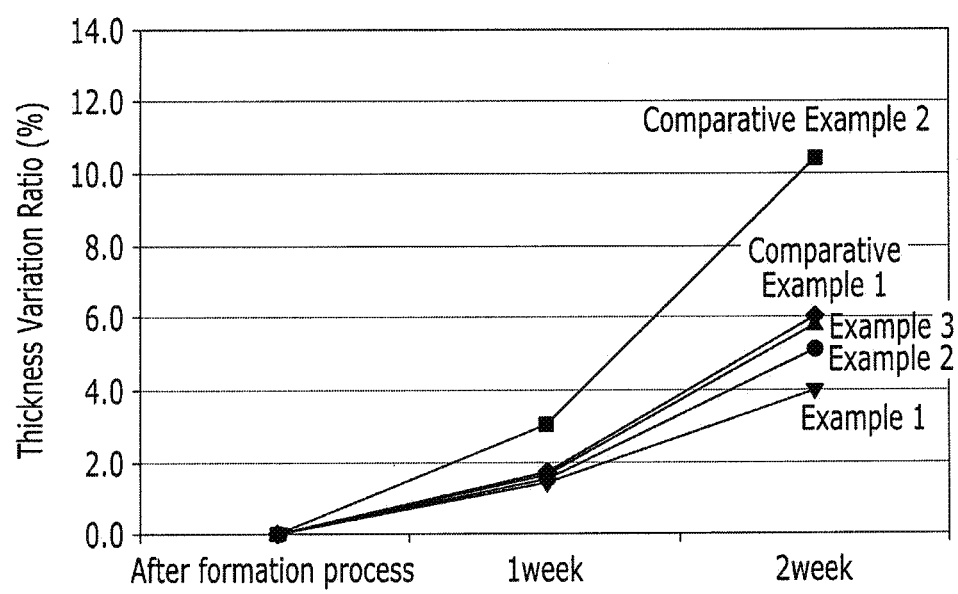
FIG. 3 is a graph showing thickness variation ratios of the rechargeable lithium battery cells according to Examples 1 to 3 and Comparative Examples 1 and 2 when the cells are allowed to stand at a high temperature.

FIG. 3 is a graph showing thickness variation ratios of the rechargeable lithium battery cells according to Examples 1 to 3 and Comparative Examples 1 and 2, when the cells were allowed to stand at a high temperature.

Referring to FIG. 3, rechargeable lithium battery cells of Examples 1 to 3, which included the electrolyte including the sulfur-containing compound represented by Chemical Formula 1 and the phosphazene compound represented by Chemical Formula 2, showed a lower thickness increase ratio when allowed to stand at a high temperature, compared with the rechargeable lithium battery cells of Comparative Examples 1 and 2.

Evaluation 4: Safety of Rechargeable Lithium Battery Cell

Figure 4:
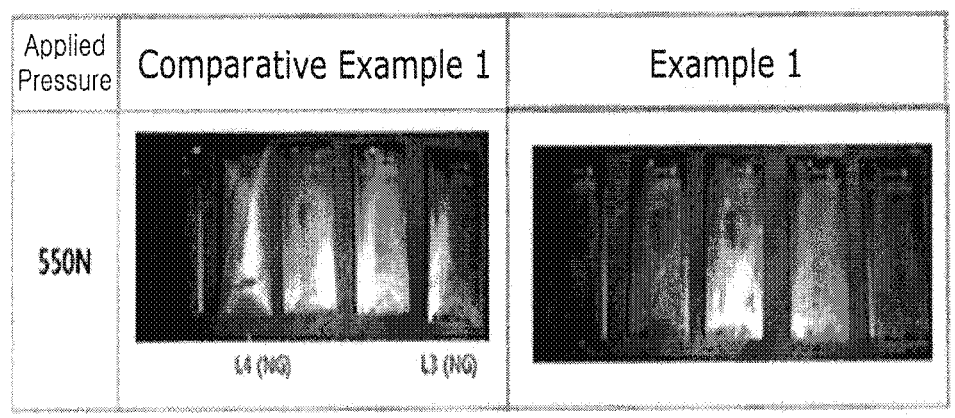
FIG. 4 is a photograph showing the blunt nail crush (BNC) test results of the rechargeable lithium battery cells of Example 1 and Comparative Example 1 in terms of external dent.
Figure 5:
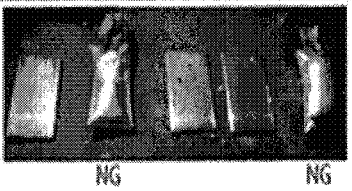
FIG. 5 is a photograph showing the blunt nail crush (BNC) test results of the rechargeable lithium battery cells of Example 2 and Comparative Example 2 in terms of external dent.

The rechargeable lithium battery cells according to Examples 1 and 2 and Comparative Examples 1 and 2 were each pressed with 550N, 600N and 650N and crushed to perform a blunt nail crush (BNC) test by evaluating the external dent, and the results are provided in FIGS. 4 and 5.

FIG. 4 is a photograph showing the blunt nail crush (BNC) test results of the rechargeable lithium battery cells of Example 1 and Comparative Example 1.

Referring to FIG. 4, the rechargeable lithium battery cell according to Example 1 showed no ignition under a pressure of 550N and thus, better safety compared with the rechargeable lithium battery cell according to Comparative Example 1.

FIG. 5 is a photograph showing the blunt nail crush (BNC) test results of the rechargeable lithium battery cells according to Example 2 and Comparative Example 2.

Referring to FIG. 5, the rechargeable lithium battery cell according to Example 2 showed no ignition under a pressure of 550N and 600N and thus, significantly better safety compared with the rechargeable lithium battery cell according to Comparative Example 2.

Evaluation 5: Penetration Characteristics of Rechargeable Lithium Battery Cell

Penetration characteristics of the rechargeable lithium battery cells according to Examples 1 and 2 and Comparative Examples 1 and 2 were evaluated by a penetration evaluation test, and the results are provided in FIGS. 6A to 6D and 7.

The penetration evaluation test was performed at 40 mm/s or 5 mm/s by utilizing a 2.5 mm nail, after overcharging the rechargeable lithium battery cells at 4.5 V, and the voltage or temperature profile during the penetration of each of the rechargeable lithium battery cells were obtained by attaching a temperature sensor and a voltage sensor on the surface of the cells.

Figure 6A:
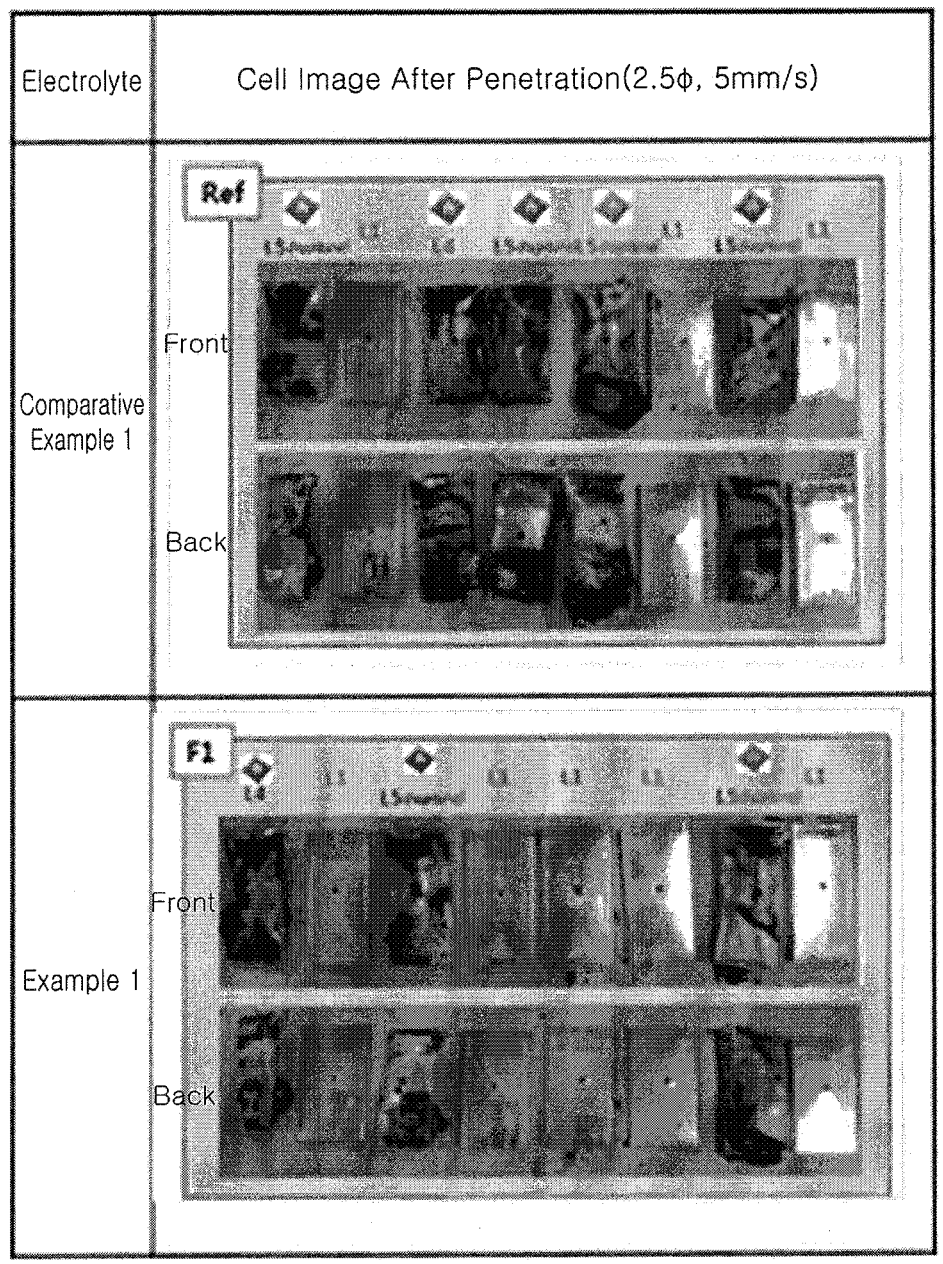
FIG. 6A is a photograph showing the 5 mm/s penetration test results of the rechargeable lithium battery cells of Example 1 and Comparative Example 1.
Figure 6B:
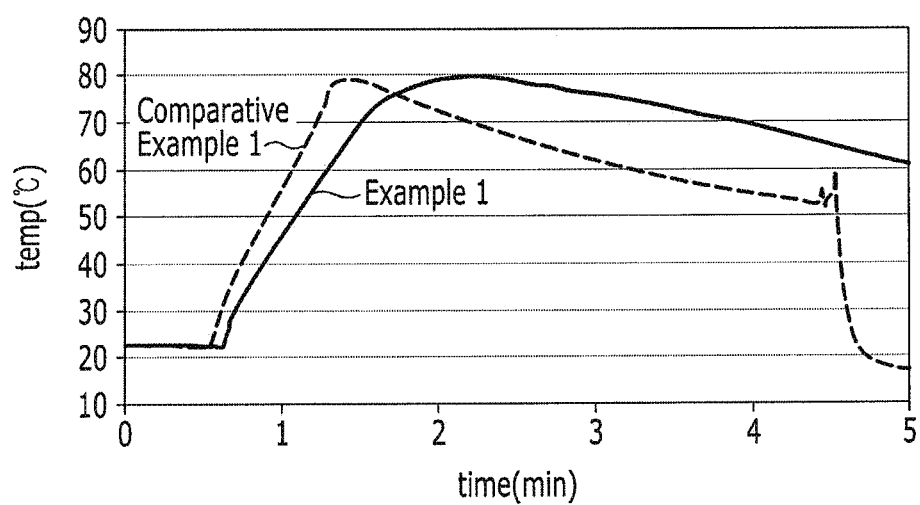
FIGS. 6B to 6D are each a graph showing a temperature change on the surface of the cells that exhibited L1 and L5 evaluation results, as shown in FIG. 6A, and FIG. 6D further shows a voltage change of the cell that exhibited an L1 evaluation result.
Figure 6C:
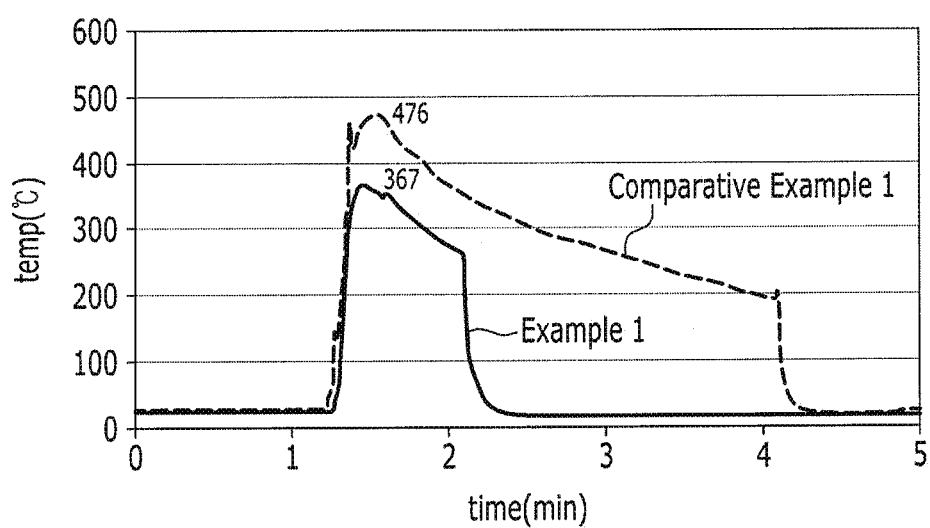
Figure 6D:
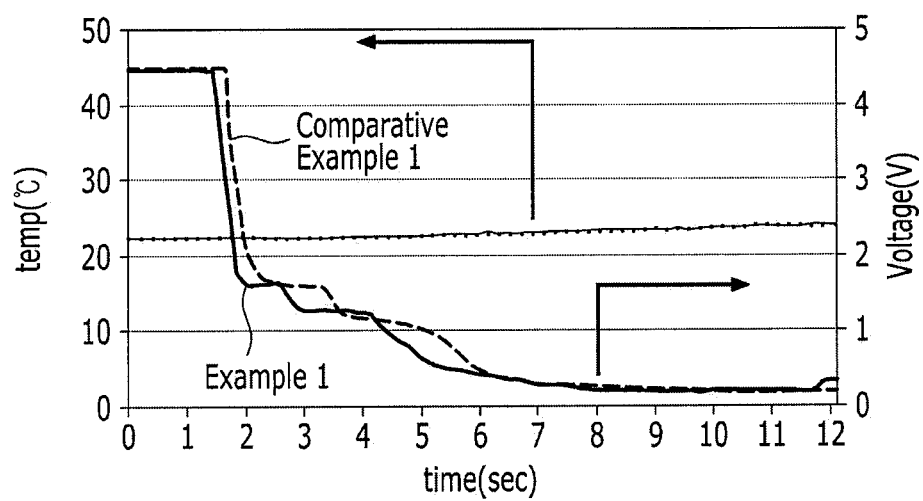

FIG. 6A is a cell photograph showing the 5 mm/s penetration evaluation test results of the rechargeable lithium battery cells according to Example 1 and Comparative Example 1, and FIGS. 6B to 6D are each a graph showing a temperature change on the surface of the cells that exhibited L1 and L5 evaluation results, respectively, as shown in FIG. 6A, and FIG. 6D further shows a voltage change of the cell that exhibited L1 evaluation result.

Evaluation results L0 through L5 are as follows:
L0: no leak
L1: occurrence of a leak and heat of less than 150° C. was generated;
L2: heat of less than 200° C. was generated;
L3: smoke and heat of greater than 200° C. was generated;
L4: a flame generated;
L5: explosion.

Referring to FIG. 6A, the cells according to Example 1 had significantly better penetration characteristics compared to the cells of Comparative Example 1, in which most of the cells exploded after penetration.

Referring to FIG. 6B, although the cells of both Example 1 and Comparative Example 1 showed an L1 evaluation result, the temperature increase (relative to time) on the surface of the cell according to Example 1 exhibited a less steep slope than that of the cell of Comparative Example 1. Without being bound by any particular theory, it is believed that this result may be caused by the flame retardancy characteristics of the electrolyte having exothermic self-suppression characteristics (i.e. self-extinguishing characteristics).

Referring to FIG. 6C, although the cells of Example 1 and Comparative Example 1 both showed an L5 evaluation result and both exploded, the cell of Example 1 showed a maximum surface temperature of 367° C., while the cell of Comparative Example 1 showed a maximum surface temperature of 476° C.

Referring to FIG. 6D, the cells of Example 1 and Comparative Example 1 showed different voltage drops during the penetration. In more detail, the penetration of a cell through a positively-charged can and positive electrode plate and a negatively-charged negative electrode plate by a nail causes an internal short circuit. The resulting short circuit causes a current leak out of the can and thus, rapidly drops the voltage. The faster the voltage drops, the better the chances of preventing (or reducing) the thermal runaway of the cell. Although the cells of both Example 1 and Comparative Example 1 exhibited an L1 evaluation result, the cell of Example 1 showed a slightly more rapid voltage drop compared to that of the cell of Comparative Example 1. Without being bound by any particular theory, it is believed that the reason for this result is that the cell of Example 1 had lower interface resistance.

Figure 7:
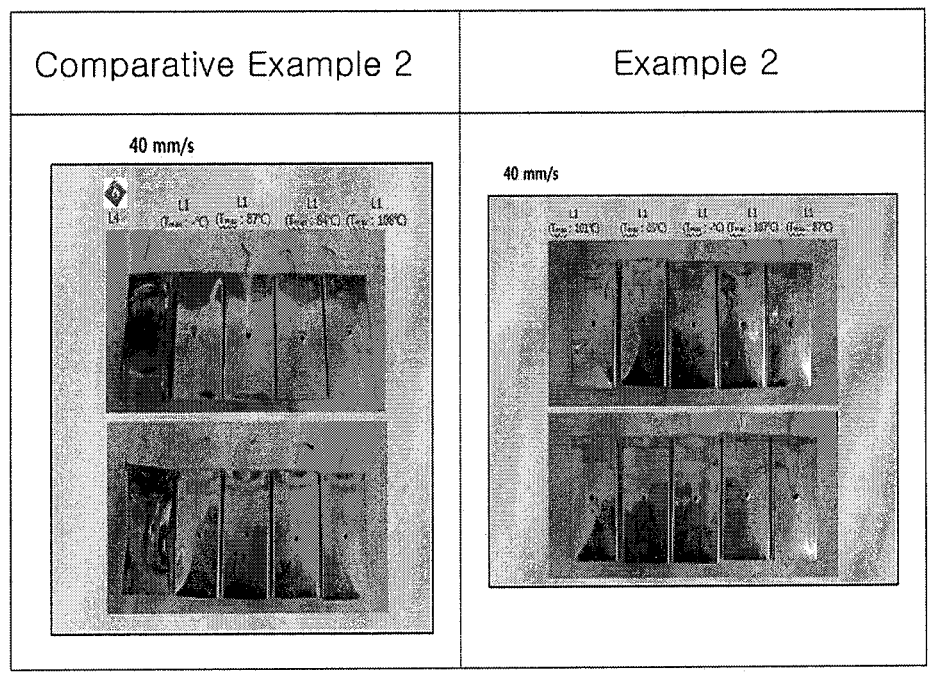
FIG. 7 is a photograph showing the 40 mm/s penetration test results of the rechargeable lithium battery cells according to Example 2 and Comparative Example 2.

FIG. 7 is a cell photograph showing the 40 mm/s penetration test result of the rechargeable lithium battery cells according to Example 2 and Comparative Example 2.

Referring to FIG. 7, the cell of Example 2 showed significantly better penetration characteristics compared with the cells of Comparative Example 2.

Evaluation 6: Compression Characteristics of Rechargeable Lithium Battery Cell

The compression characteristics of the rechargeable lithium battery cells according to Example 2 and Comparative Example 2 were evaluated, and the results are provided in FIG. 8.

The compression evaluation was performed in the following order:

1) The charge of each of the cells was paused for about 2 hours to about 72 hours, after 4.4V 0.05 C cut-off charge at 25° C.

2) Each battery cell was put between two iron plates. A jig having a height corresponding to 63% of the width of the battery cell was fixed at the side of the battery cell, while the battery cell was set to stand on its side.

3) The cell was compressed until the pressure applied thereto reached a maximum pressure of 13 kN. When the maximum pressure was reached, the compression was stopped.

4) After removing the jig, the surface temperature and appearance of the battery cell were examined.

FIG. 8 is a cell photograph showing the compression test results of the rechargeable lithium battery cells according to Example 2 and Comparative Example 2.

Referring to FIG. 8, since one cell in Comparative Example 2 exploded after the compression, the cells of Example 2 showed significantly better compression characteristics compared with the cells of Comparative Example 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

DESCRIPTION OF SYMBOLS

100: rechargeable lithium battery
112: negative electrode
113: separator
114: positive electrode
120: battery case
140: sealing member

What is claimed is:

1. An electrolyte for a rechargeable lithium battery comprising:
a lithium salt;
an organic solvent comprising a sulfur containing compound represented by Chemical Formula 1, the sulfur containing compound in an amount of about 0.1% to about 20% by volume based on total amount of the organic solvent, and
an additive comprising a phosphazene compound represented by one selected from Chemical Formulae 3 and 4, the phosphazene compound being in an amount of about 3 to about 15 parts by weight based on 100 parts by weight of the organic solvent:

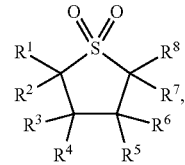

Chemical Formula 1 wherein
$R^1$ to $R^8$ are each independently hydrogen,

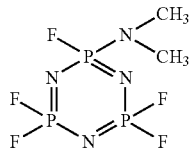

Chemical Formula 3

-continued

Chemical Formula 4

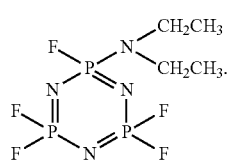

2. The electrolyte of claim 1, wherein the sulfur-containing compound is in an amount of about 0.1% to about 10% by volume based on the total amount of the organic solvent.

3. The electrolyte for a rechargeable lithium battery of claim 1, wherein the organic solvent further comprises a carbonate-based compound selected from diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and a combination thereof.

4. The electrolyte for a rechargeable lithium battery of claim 1, wherein the additive further comprises fluoroethylene carbonate, vinylethylene carbonate, propane sultone, succinonitrile, adiponitrile, $LiBF_4$, or a combination thereof.

5. The electrolyte for a rechargeable lithium battery of claim 1, wherein the electrolyte has a viscosity of less than or equal to about 7 cP.

6. The electrolyte for a rechargeable lithium battery of claim 1, wherein the electrolyte has an ion conductivity of greater than or equal to about 5 mS/cm.

7. A rechargeable lithium battery comprising:
a positive electrode;
a negative electrode;
a separator; and
the electrolyte of claim 1.

* * * * *